(12) United States Patent
Bansal et al.

(10) Patent No.: US 9,069,469 B2
(45) Date of Patent: Jun. 30, 2015

(54) SHARING AND SYNCHRONIZING DATA ACROSS USERS OF CLOUD COMPUTING SYSTEMS

(71) Applicant: Apple Inc., Cupertino, CA (US)

(72) Inventors: Monika Bansal, Sunnyvale, CA (US); Swapnil R. Dave, Santa Clara, CA (US); Devrim Varoglu, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 190 days.

(21) Appl. No.: 13/627,958

(22) Filed: Sep. 26, 2012

(65) Prior Publication Data

US 2014/0075130 A1    Mar. 13, 2014

Related U.S. Application Data

(60) Provisional application No. 61/699,106, filed on Sep. 10, 2012.

(51) Int. Cl.
*G06F 12/00* (2006.01)
*G06F 13/00* (2006.01)
*G06F 3/06* (2006.01)
*G06F 17/30* (2006.01)

(52) U.S. Cl.
CPC ............ *G06F 3/0605* (2013.01); *G06F 3/0667* (2013.01); *G06F 3/067* (2013.01); *G06F 17/30194* (2013.01); *G06F 17/30235* (2013.01)

(58) Field of Classification Search
None
See application file for complete search history.

(56) References Cited

U.S. PATENT DOCUMENTS

| | | | |
|---|---|---|---|
| 2010/0070732 A1* | 3/2010 | Strutt | 711/170 |
| 2010/0100678 A1* | 4/2010 | Kobayashi | 711/114 |
| 2012/0089569 A1* | 4/2012 | Mason et al. | 707/639 |
| 2012/0102080 A1* | 4/2012 | Kirihata et al. | 707/831 |
| 2012/0166576 A1* | 6/2012 | Orsini et al. | 709/217 |
| 2012/0221520 A1* | 8/2012 | Garrett et al. | 707/622 |
| 2013/0080411 A1* | 3/2013 | Rolia et al. | 707/694 |

* cited by examiner

*Primary Examiner* — Sean D Rossiter
(74) *Attorney, Agent, or Firm* — Park, Vaughan, Fleming & Dowler LLP; Chia-Hsin Suen (57) ABSTRACT

The disclosed embodiments provide a system that processes data from a user. During operation, the system obtains, at a cloud computing system, a set of data-sharing preferences for the user. Next, the system creates a set of virtual storage partitions for the user with the cloud computing system based on the data-sharing preferences. Upon receiving data from the user to the cloud computing system, the system associates the data with a virtual storage partition from the set of virtual storage partitions based on the data-sharing preferences and a set of data attributes for the data. Finally, the system manages access to the virtual storage partition by one or more other users based on the data-sharing preferences.

21 Claims, 5 Drawing Sheets

SHARING AND SYNCHRONIZING DATA ACROSS USERS OF CLOUD COMPUTING SYSTEMS

RELATED APPLICATION

This application claims the benefit of U.S. Provisional Application No. 61/699,106, entitled "Sharing and Synchronizing Data Across Users of Cloud Computing Systems," by inventors Monika Bansal, Devrim Varoglu and Swapnil R. Dave, filed 10 Sep. 2012.

BACKGROUND

1. Field

The disclosed embodiments relate to techniques for sharing data among users. More specifically, the disclosed embodiments relate to techniques for sharing and synchronizing data across users of cloud computing systems.

2. Related Art

Network-enabled users commonly use cloud computing systems to store, manage, and/or synchronize data. For example, a user may store images, audio, video, documents, and/or other files on an electronic device such as a laptop computer, personal computer, tablet computer, mobile phone, and/or portable media player. The user may also have a user account with a cloud computing system that allows copies of the files to be stored and/or backed up at the cloud computing system. The cloud computing system may additionally transmit the copies to other electronic devices of the user, thus synchronizing the data across the users' devices and with the user account.

However, automatic synchronization and/or sharing of data are typically unavailable between users and/or user accounts of cloud computing systems. Instead, a user may share data with another user using conventional digital communication mechanisms, which may require manual setup and/or configuration by the user. For example, the user may share a photo album with the other user by uploading the photo album to the user's user account with a photo-sharing site and sending a link to the photo album to the other user via email, instant message, and/or text message. The other user may then access the photo album by directing a web browser to the link. As a result, the user may be required to select the appropriate link to the photo album and address the email, instant message, and/or text message to the other user to successfully share the photo album with the other user. Alternatively, the user may upload the photo album to a remote directory with the cloud computing system and manually grant access to the remote directory for the other user. However, sharing of the photo album through the cloud computing system may not work if the user uploads the photo to the wrong directory, shares the wrong directory with the other user, and/or shares the correct directory with the wrong user. Consequently, existing techniques for sharing and/or synchronizing data between users may be tedious, confusing, error-prone, and/or time-consuming for the users.

SUMMARY

The disclosed embodiments provide a system that processes data from a user. During operation, the system obtains, at a cloud computing system, a set of data-sharing preferences for the user. Next, the system creates a set of virtual storage partitions for the user with the cloud computing system based on the data-sharing preferences. Upon receiving data from the user to the cloud computing system, the system associates the data with a virtual storage partition from the set of virtual storage partitions based on the data-sharing preferences and a set of data attributes for the data. Finally, the system manages access to the virtual storage partition by one or more other users based on the data-sharing preferences.

In some embodiments, associating the data with the virtual storage partition based on the data-sharing preferences and the set of data attributes involves matching a subset of the data-sharing preferences to one or more of the data attributes, and identifying the virtual storage partition associated with the subset of the data-sharing preferences.

In some embodiments, managing access to the virtual storage partition by the one or more other users based on the data-sharing preferences involves enabling access to the virtual storage partition by the one or more other users if the one or more other users are associated with the subset of the data-sharing preferences, and denying access to the virtual storage partition by the one or more other users if the one or more other users are not associated with the subset of the data-sharing preferences.

In some embodiments, enabling access to the virtual storage partition by the one or more other users involves at least one of automatically transmitting the data to the one or more other users, and enabling queries from the one or more other users to the cloud computing system for the data.

In some embodiments, access to the virtual storage partition by the one or more other users is associated with at least one of an invitation from the user to the one or more other users and a request from the one or more other users to access the data.

In some embodiments, the data-sharing preferences are obtained with the data or separately from the data.

In some embodiments, the data-sharing preferences include a data type, a data source, an electronic device associated with the user, a location of the user, a time span, and/or one or more other users.

In some embodiments, data attributes include a data type, a data source, an identifier for the data, a timestamp, a location, and/or an electronic device associated with the data.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
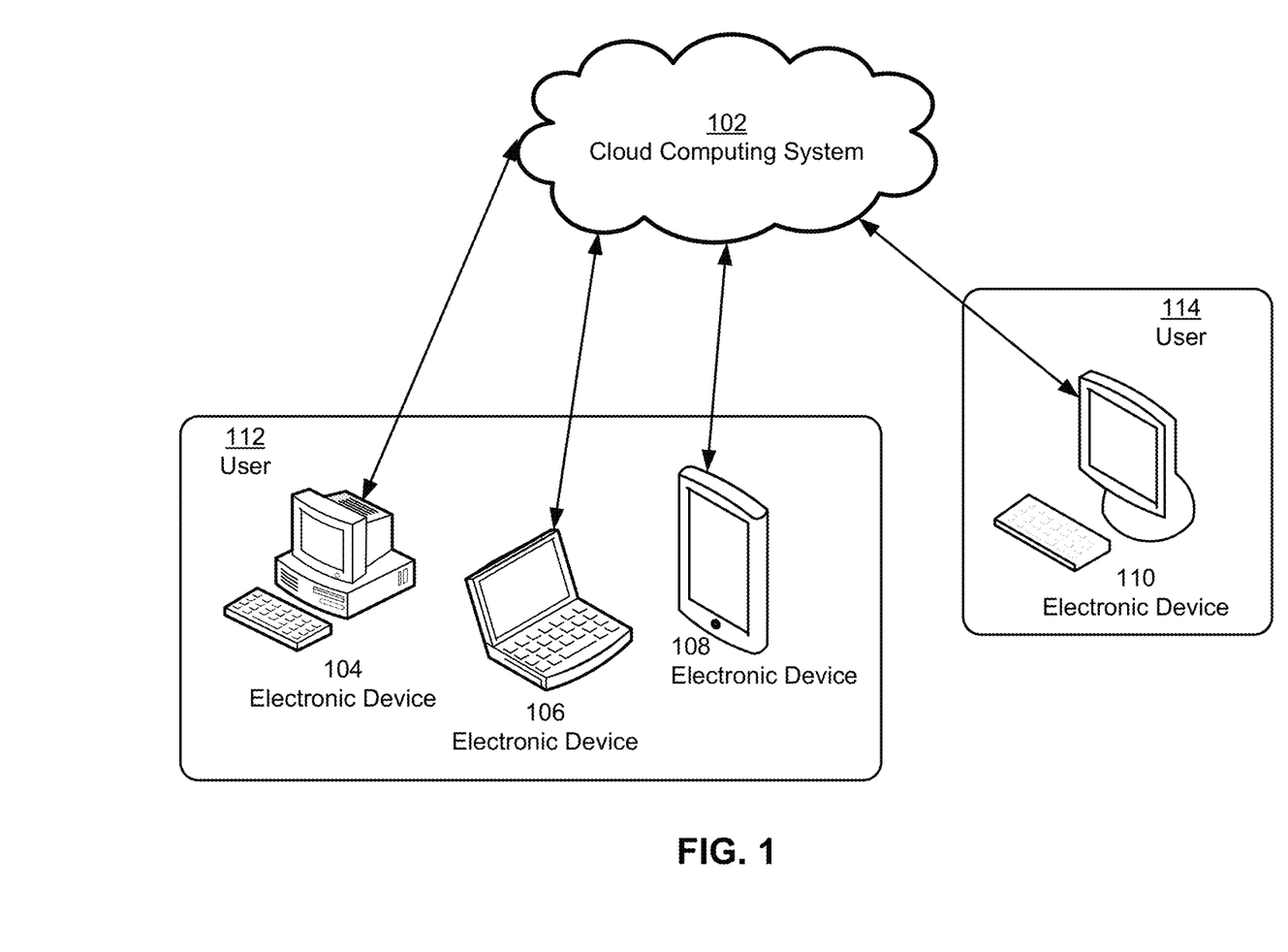
FIG. 1 shows a schematic of a system in accordance with the disclosed embodiments.

The disclosed embodiments provide a method and system for processing data. More specifically, the disclosed embodiments provide a method and system for sharing and synchronizing data across users of cloud computing systems. As shown in FIG. 1, a cloud computing system 102 may be used by a first user 112 and a second user 114. For example, each user 112-114 may store digital content such as music, pictures, video, documents, and/or other files with a user account of the user on cloud computing system 102.

Users 112-114 may interact with cloud computing system 102 through a number of electronic devices 104-110, such as personal computers, laptop computers, tablet computers, mobile phones, portable media players, and/or other network-enabled electronic devices. For example, user 112 may use one of three electronic devices 104-108 to communicate with cloud computing system 102, while user 114 may use one electronic device 110 to access cloud computing system 102.

To access cloud computing system 102, users 112-114 may use electronic devices 104-110 to provide authentication credentials for users 112-114 and/or electronic devices 104-110 to cloud computing system 102. After users 112-114 and/or electronic devices 104-110 are authenticated using the authentication credentials, users 112-114 and/or electronic devices 104-110 may use cloud computing system 102 by sending and receiving data associated with users 112-114 on cloud computing system 102. For example, user 112 may upload one or more files from electronic device 104 to cloud computing system 102 to store and/or back up the file(s) on cloud computing system 102. User 112 may also configure his/her user account with cloud computing system 102 to automatically transmit the uploaded file(s) to other electronic devices 106-108 of user 112, thus synchronizing data associated with the user account across all electronic devices 104-108 of the user.

However, such automatic synchronization of data may not be available across users 112-114 and/or user accounts of cloud computing system 102. Instead, users 112-114 may rely on conventional and/or manual techniques for sharing data with one another. For example, user 112 may share a file with user 114 by attaching the file in an email to user 114, establishing a peer-to-peer file transfer with user 114, and/or placing the file in a directory on cloud computing system 102 and enabling access to the directory for user 114.

In turn, users 112-114 may find sharing data with one another to be tedious, time-consuming, error-prone, and/or confusing. Continuing with the above example, user 112 may be required to locate a directory and/or electronic device 104-108 containing the file before user 112 is able to email, transfer, and/or upload the file. Moreover, user 112 may fail to share the file with user 114 via email by forgetting to attach the file to the email, addressing the email to the wrong user, and/or attaching the wrong file to the email. Similarly, errors in peer-to-peer transfer of the file may occur if user 112 transfers the file to a different user and/or transfers the wrong file to user 114. Finally, users 112-114 may encounter issues with sharing the file through a user-configured directory on cloud computing system 102 if user 112 places the file in the wrong directory, shares the directory with a different user, and/or shares the wrong directory on cloud computing system 102 with user 114.

In one or more embodiments, cloud computing system 102 includes functionality to reduce overhead associated with sharing data between users 112-114 by allowing data to be shared and/or synchronized between users 112-114 without requiring users 112-114 to manually configure the mechanisms through which the data is shared and/or synchronized. As discussed in further detail below, cloud computing system 102 may obtain a set of data-sharing preferences for a user (e.g., users 112-114) and create a set of virtual storage partitions for the user based on the data-sharing preferences. Data from the user to cloud computing system 102 may then be associated with one of the virtual storage partitions based on the data-sharing preferences and a set of data attributes for the data, and access to the virtual storage partitions by other users of cloud computing system 102 may be managed based on the data-sharing preferences.

Figure 2:
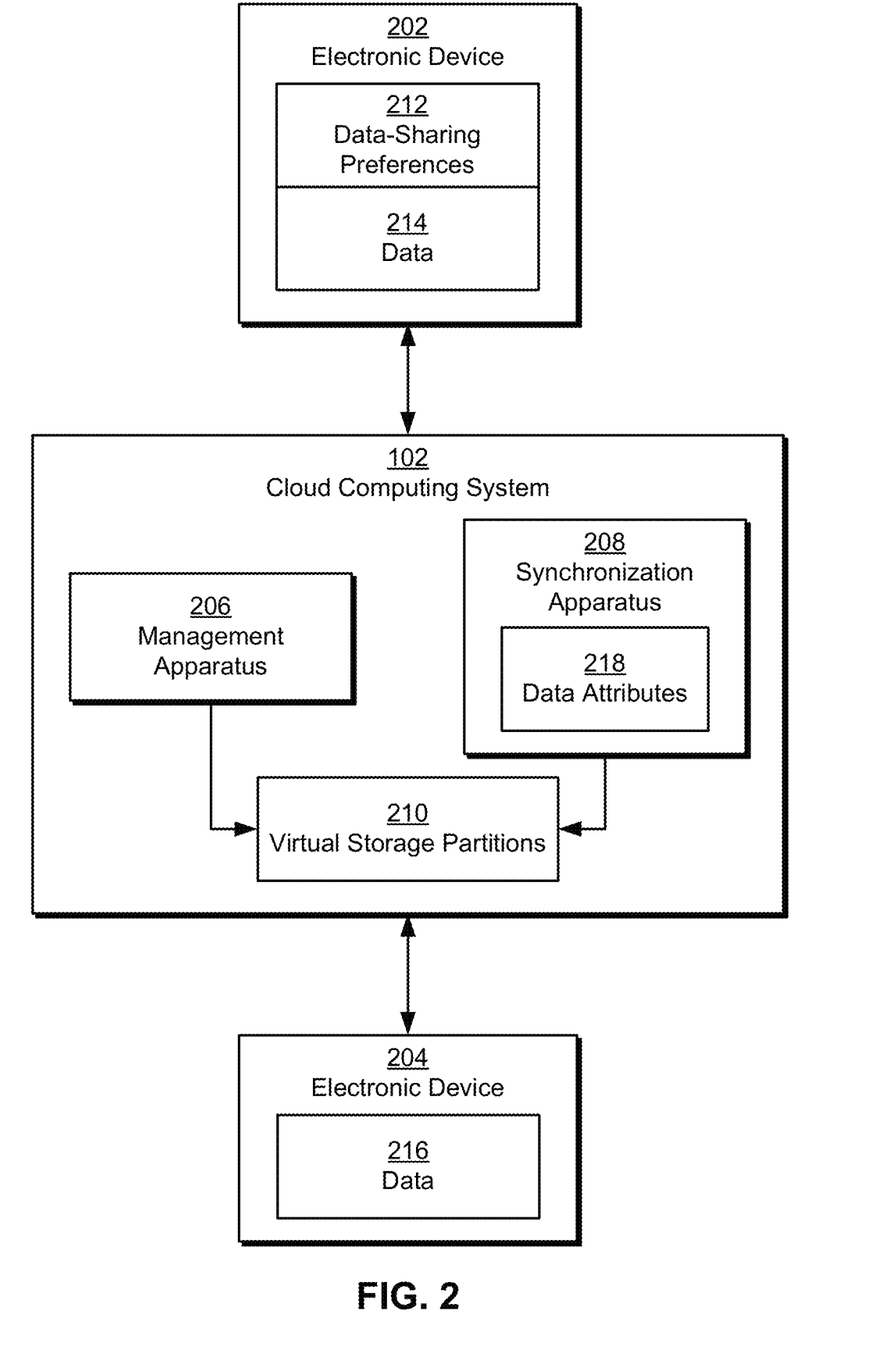
FIG. 2 shows a system for processing data from a user in accordance with the disclosed embodiments.

FIG. 2 shows a system for processing data 214 from a user (e.g., users 112-114 of FIG. 1) in accordance with the disclosed embodiments. As shown in FIG. 2, data 214 may initially be generated by and/or stored on an electronic device 202 of the user. For example, data 214 may correspond to an image taken by the user on a mobile phone and/or a document created by the user on a laptop computer. Alternatively, data 214 may be downloaded by the user from a website, email, and/or other network-based resource onto electronic device 202.

The user may also specify one or more data-sharing preferences 212 for data 214 and/or other data associated with the user on cloud computing system 102. For example, the user may provide data-sharing preferences 212 through a user interface of electronic device 202 and/or another electronic device of the user. In addition, the user may provide data-sharing preferences 212 together with data 214 and/or other data to be shared, or the user may provide data-sharing preferences 212 separately from the data to be shared. For example, the user may select data-sharing preferences 212 for a photo album while the user takes photos for the photo album on electronic device 202. On the other hand, the user may specify data-sharing preferences 212 for a project containing a set of documents before or after the documents are created and/or modified on electronic device 202. Data-sharing preferences 212 may then be transmitted to cloud computing system 102 for use in managing the sharing and synchronization of the data with other users of cloud computing system 102.

In one or more embodiments, data-sharing preferences 212 include a data type, a data source, an electronic device (e.g., electronic device 202) associated with the user, a location of the user, a time span, and/or one or more other users of cloud computing system 102. For example, data-sharing preferences 212 may specify the types of data to be shared with the other users, such as music, images, video, and/or documents. Data-sharing preferences 212 may also identify a source, context, and/or grouping associated with the data, such as a particular application, photo album, project, and/or electronic device of the user. Data-sharing preferences 212 may further specify that the data be shared while the user is at a specific geographic location and/or during a specific time frame. Finally, data-sharing preferences 212 may identify the other users with whom the data is to be shared.

A management apparatus 206 in cloud computing system 102 may receive data-sharing preferences 212 from electronic device 202 and/or other electronic devices of the user and create a set of virtual storage partitions 210 for the user on cloud computing system 102. Each virtual storage partition may represent a set of data to be shared with one or more other users of cloud computing system 102, as indicated by data-sharing preferences 212. For example, a virtual storage partition may be created for photos taken over the next three days for sharing with the user's family members. Another virtual storage partition may be created for files and/or documents uploaded from the user's laptop computer for sharing with the user's collaborators on a project. Finally, one or more virtual storage partitions 210 may be created and restricted to access by only the user. Virtual storage partitions 210 are discussed in further detail below with respect to FIG. 3.

Data 214 and/or other data for the user may then be transmitted from electronic device 202 and/or other electronic devices of the user to cloud computing system 102. Once the data is received, a synchronization apparatus 208 in cloud computing system 102 may associate the data with a virtual storage partition from virtual storage partitions 210 based on data-sharing preferences 212 and a set of data attributes 218 for the data. More specifically, synchronization apparatus 208 may match a subset of data-sharing preferences 212 to one or more of data attributes 218 and identify the virtual storage partition associated with the subset of data-sharing preferences 212.

Because data attributes 218 are matched to data-sharing preferences 212, data attributes 218 may include a number of similar and/or analogous elements to those from data-sharing preferences 212. For example, data attributes 218 may include a data type (e.g., music, pictures, video, documents, etc.), a data source (e.g., project, photo album, application, etc.), an identifier for the data (e.g., filename, numeric identifier, etc.), a timestamp (e.g., date of creation), a location (e.g., location coordinates), and/or an electronic device associated with the data (e.g., electronic device 202). Once data attributes 218 are matched to the corresponding subset of data-sharing preferences 212, the virtual storage partition associated with the subset of data-sharing preferences 212 may be identified, and the data may be "stored" in the virtual storage partition and/or referenced by the virtual storage partition.

Synchronization apparatus 208 may also manage access to virtual storage partitions 210 by other users of cloud computing system 102. If another user is associated with and/or identified by one or more data-sharing preferences 212, synchronization apparatus 208 may enable access to the virtual storage partition corresponding to the data-sharing preferences. If the other user is not associated with and/or identified by any data-sharing preferences 212, synchronization apparatus 208 may deny access to virtual storage partitions 210 by the other user.

If the other user is granted access to the virtual storage partition, synchronization apparatus 208 may synchronize the data associated with the virtual storage partition with an electronic device 204 and/or other electronic devices of the other user. For example, synchronization apparatus 208 may employ a "push" model that automatically transmits the data to electronic device 204 once the data is associated with the virtual storage partition in cloud computing system 102. Alternatively, synchronization apparatus 208 may allow electronic device 204 to pull the data from cloud computing system 102 by enabling queries from electronic device 204 to cloud computing system 102 for the data. Once the data is received by electronic device 204, the data may be stored locally on electronic device 204 as data 216, and the other user may use electronic device 204 to access the shared data 216.

In one or more embodiments, access to data 214 and/or other data associated with the user by other users is associated with an invitation from the user to the other users. For example, the user may initiate sharing of data with friends, family, coworkers, acquaintances, and/or other users on cloud computing system 102 by providing names, contact information, and/or handles for the other users to cloud computing system 102. Next, cloud computing system 102 may send invitations to the other users to connect with the user. Once the invitations are accepted by the other users, the user may be able to specify the other users in data-sharing preferences 212 and automatically synchronize and/or share the data with the other users through cloud computing system 102.

On the other hand, access to data 214 and/or other data for the user by the other users may be based on a request from the other users to access the data. For example, another user may transmit a request to cloud computing system 102 for access to photos taken by the user at a specific location and/or event. Cloud computing system 102 may forward the request to the user and associate the other user with the virtual storage partition containing the photos once the user approves the request. The photos may then be retrieved by the other user from cloud computing system 102 or automatically pushed to the other user's electronic device by cloud computing system 102.

Because cloud computing system 102 uses data-sharing preferences 212 to create virtual storage partitions 210, associate data (e.g., data 214) for the user with virtual storage partitions 210, and enable access to virtual storage partitions 210 by other users, cloud computing system 102 may streamline the sharing and/or synchronization of data between the user and the other users. More specifically, management apparatus 206 and synchronization apparatus 208 may allow the user to share and/or synchronize data with the other users without manually setting up and/or configuring the mechanism(s) through which the data is shared and/or synchronized. In turn, management apparatus 206 and synchronization apparatus 208 may reduce overhead and/or errors associated with sharing data across users and/or user accounts.

Those skilled in the art will appreciate that the system of FIG. 2 may be implemented in a variety of ways. In particular, management apparatus 206 and synchronization apparatus 208 may be provided by the same software and/or hardware component, or management apparatus 206 and synchronization apparatus 208 may execute independently from one another. For example, the functionality of management apparatus 206 and synchronization apparatus 208 may be implemented by a single server and/or component, or management apparatus 206 and synchronization apparatus 208 may be implemented by multiple distributed components and/or servers within cloud computing system 102.

Figure 3:
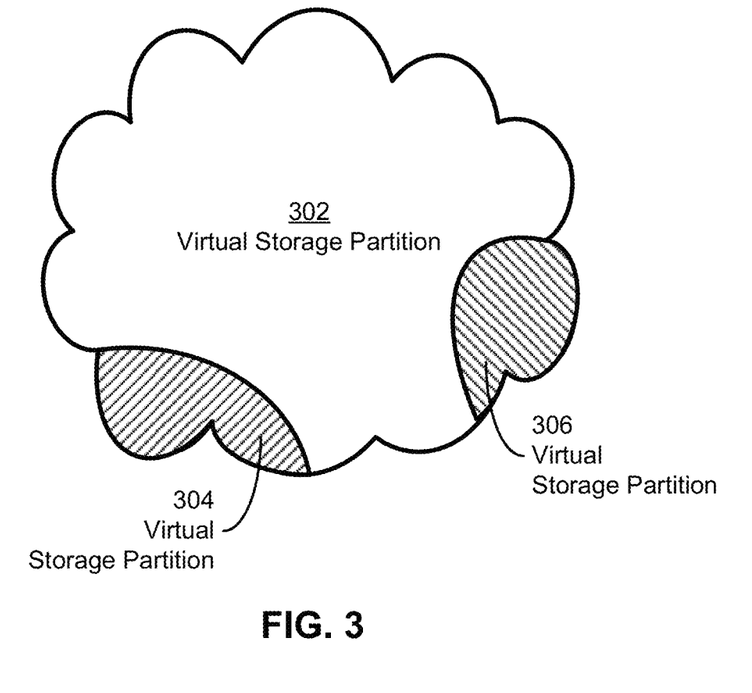
FIG. 3 shows an exemplary set of virtual storage partitions for a user in accordance with the disclosed embodiments.

FIG. 3 shows an exemplary set of virtual storage partitions 302-306 for a user in accordance with the disclosed embodiments. As mentioned above, virtual storage partitions 302-306 may be created by a cloud computing system (e.g., cloud computing system 102 of FIG. 1) based on a set of data-sharing preferences (e.g., data-sharing preferences 212 of FIG. 2) for the user.

In addition, data (e.g., data 214 of FIG. 2) from the user may be associated with virtual storage partitions 302-306 to enable sharing and/or synchronization of the data with other users of the cloud computing system. For example, data associated with virtual storage partition 302 may be accessible by only the user. On the other hand, data associated with virtual storage partition 304 may be accessible by the user and a first group of other users specified in the data-sharing preferences, and data associated with virtual storage partition 306 may be accessible by the user and a second group of other users specified in the data-sharing preferences.

In addition, a number of mechanisms may be used to efficiently store data with the cloud computing system while associating the data with virtual storage partitions 302-306. For example, the data may be stored in a central location and tagged with identifiers for the corresponding virtual storage partitions 302-306 and/or users with access to the data. Conversely, virtual storage partitions 302-306 may include references and/or links to the centrally stored data. Finally, virtual storage partitions 304-306 may be implemented as "overlapping segments" of user accounts for the user and other users with access to virtual partitions 304-306.

Figure 4:
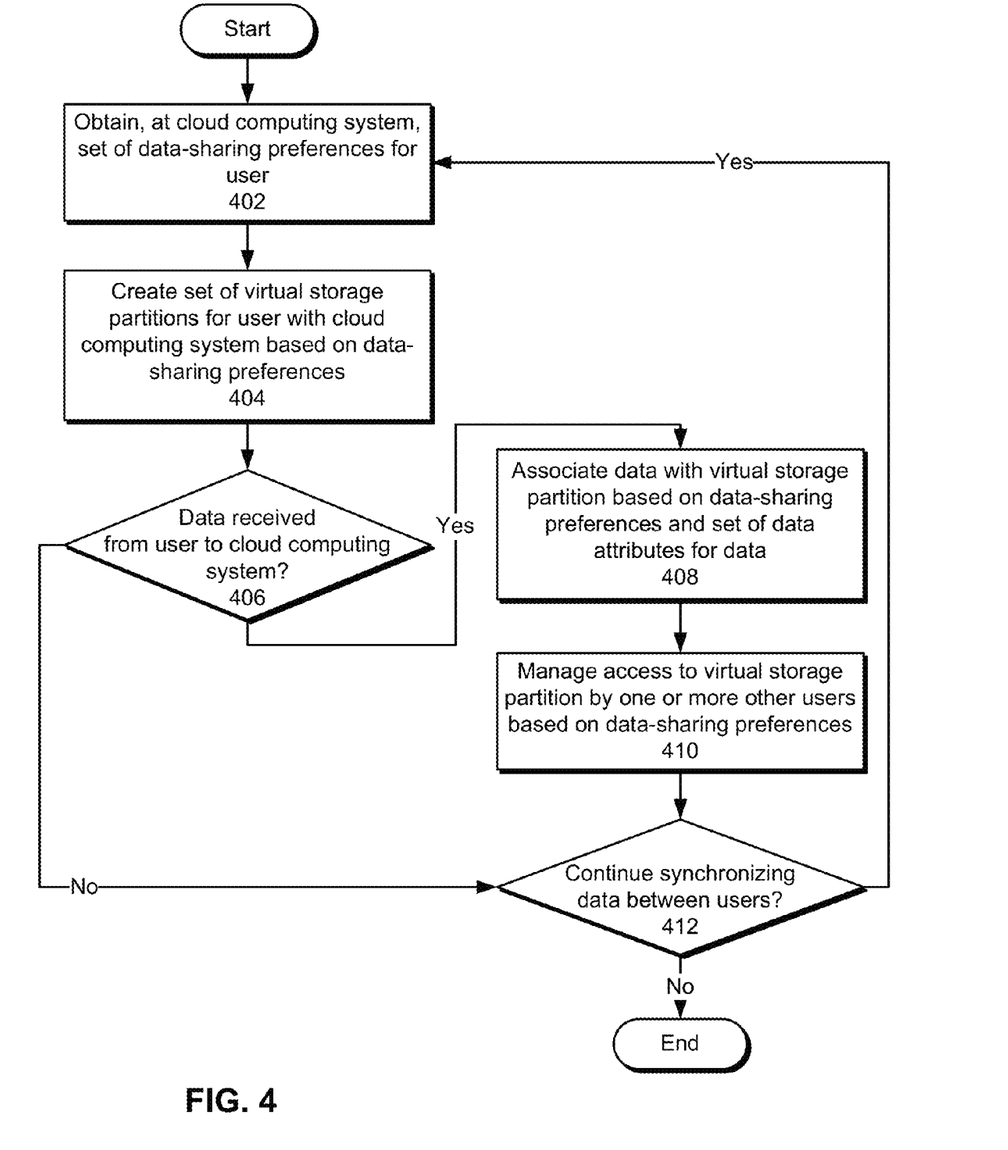
FIG. 4 shows a flowchart illustrating the process of processing data from a user in accordance with the disclosed embodiments.

FIG. 4 shows a flowchart illustrating the process of processing data from a user in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the technique.

Initially, a set of data-sharing preferences for the user is obtained at a cloud computing system (operation 402). The data-sharing preferences may include a data type, a data source, an electronic device associated with the user, a location of the user, a time span, and/or one or more other users of the cloud computing system. For example, the data-sharing preferences may specify the sharing of photos taken at a certain location and/or over a given time period with the user's family members on the cloud computing system.

Next, a set of virtual storage partitions for the user is created with the cloud computing system based on the data-sharing preferences (operation 404). For example, a virtual storage partition may be created for access only by the user, and additional virtual storage partitions may be created for different groups of people with whom the user intends to share data.

Data may also be received from the user to the cloud computing system (operation 406). For example, the user may upload a photo, document, video, and/or other file to the cloud computing system from a mobile phone, tablet computer, laptop computer, personal computer, portable media player, and/or other electronic device. The upload may also happen automatically after the file is created, downloaded, and/or modified to synchronize the data on the electronic device with the user's user account on the cloud computing system. If data is not received from the user to the cloud computing system, no data-related processing is performed for the user.

If data is received from the user to the cloud computing system, the data is associated with a virtual storage partition from the set of virtual storage partitions based on the data-sharing preferences and a set of data attributes for the data (operation 408). The data attributes may include elements that are analogous to those in the data-sharing preferences, such as a data type, a data source, an identifier for the data, a timestamp, a location, and/or an electronic device associated with the data.

To associate the data with the virtual storage partition, a subset of the data-sharing preferences may be matched to one or more of the data attributes, and the virtual storage partition associated with the subset of the data-sharing preferences may be identified. For example, one or more of the data attributes may be searched against a database and/or table containing mappings of data-sharing preferences to virtual storage partitions to find one or more entries containing data-sharing preferences that match the data attributes. Once the virtual partition is identified, the data may be associated with the virtual partition by adding a tag for the virtual partition to the data and/or referencing the data from the virtual partition.

Access to the virtual storage partition by one or more other users is then managed based on the data-sharing preferences (operation 410). For example, the other user(s) may be granted access to the virtual storage partition if the other user(s) are associated with (e.g., specified by) the subset of data-sharing preferences related to the virtual storage partition. If access to the virtual storage partition is granted to the other user(s), the data may be synchronized with the other user(s) by automatically transmitting the data to the other user(s) and/or enabling queries from the other user(s) to the cloud computing system for the data. On the other hand, the other user(s) may be denied access to the virtual storage partition if the other user(s) are not associated with the subset of data-sharing preferences.

Data may continue to be synchronized between the users (operation 412), independently of the receipt and processing of data from the user to the cloud computing system. If synchronization between the users is to continue, the data-sharing preferences for the user are continually maintained and/or updated (operation 402), and virtual partitions are created and/or modified based on the data-sharing preferences (operation 404). Data from the user to the cloud computing system may also be associated with one or more virtual storage partitions (operations 406-408), and access to the virtual storage partitions by the other users may be managed based on the data-sharing preferences (operation 410). Synchronization of data between the users may thus continue until such synchronization is disabled by the user and/or the cloud computing system is no longer used by the user.

Figure 5:
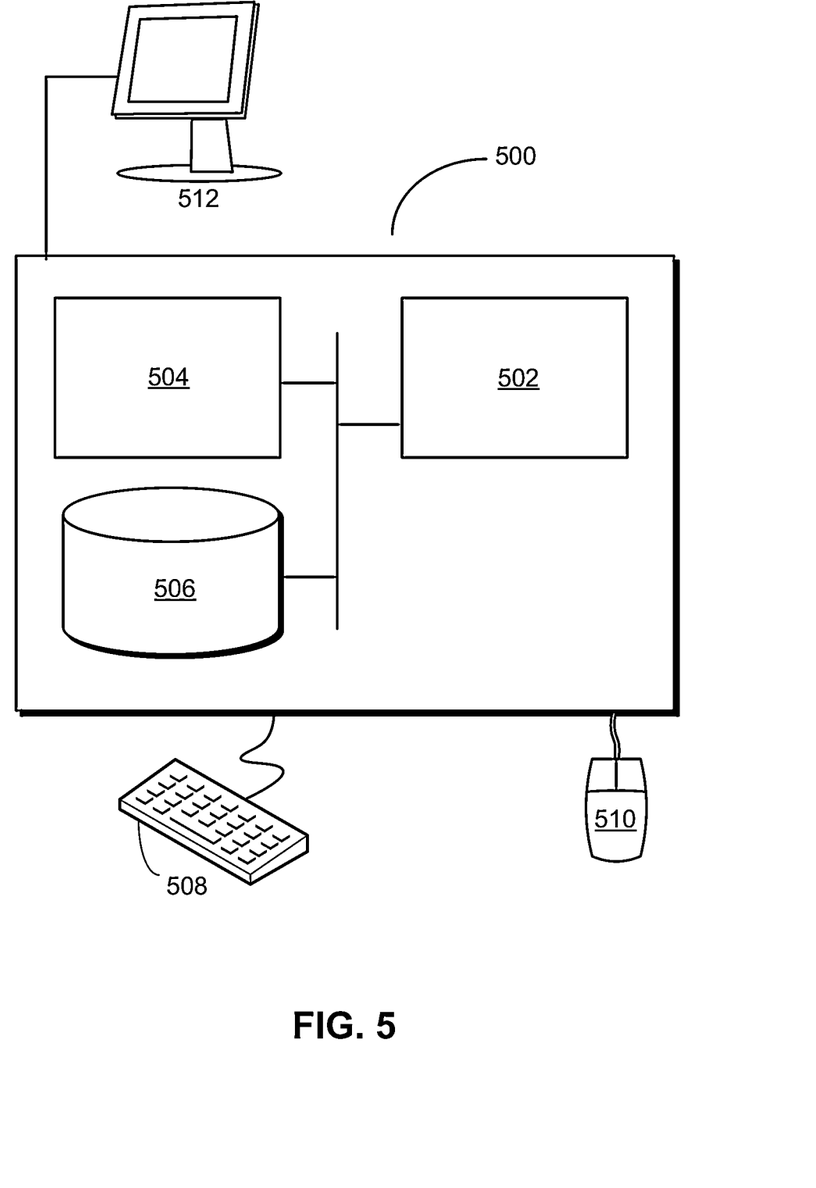
FIG. 5 shows a computer system in accordance with the disclosed embodiments.

FIG. 5 shows a computer system 500 in accordance with the disclosed embodiments. Computer system 500 may correspond to an apparatus that includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for processing data from a user. The system may include a storage-management apparatus that obtains a set of data-sharing preferences for the user and creates a set of virtual storage partitions for the user with the cloud computing system based on the data-sharing preferences. The system may also include a synchronization apparatus that associates data from the user to the cloud computing system with a virtual storage partition from the set of virtual storage partitions based on the data-sharing preferences and a set of data attributes for the data. The synchronization apparatus may additionally manage access to the virtual storage partition by one or more other users based on the data-sharing preferences.

In addition, one or more components of computer system 500 may be remotely located and connected to the other components over a network. Portions of the present embodiments (e.g., storage-management apparatus, synchronization apparatus, etc.) may also be located on different nodes of a distributed system that implements the embodiments. For example, the present embodiments may be implemented using a cloud computing system that synchronizes and shares data among users of the cloud computing system and/or electronic devices of the users.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for processing data from a user, comprising:
    obtaining, at a cloud computing system, a set of data-sharing preferences for the user;
    creating a set of virtual storage partitions for the user with the cloud computing system based on the data-sharing preferences;
    upon receiving data from the user to the cloud computing system, associating the data with a virtual storage partition from the set of virtual storage partitions based on the data-sharing preferences and a set of data attributes for the data, the associating comprising matching a subset of the data-sharing preferences to one or more of the data attributes and identifying the virtual storage partition associated with the subset of the data-sharing preferences; and
    managing access to the virtual storage partition by one or more other users based on the data-sharing preferences.

2. The computer-implemented method of claim 1, wherein managing access to the virtual storage partition by the one or more other users based on the data-sharing preferences involves:
    enabling access to the virtual storage partition by the one or more other users if the one or more other users are associated with the subset of the data-sharing preferences; and
    denying access to the virtual storage partition by the one or more other users if the one or more other users are not associated with the subset of the data-sharing preferences.

3. The computer-implemented method of claim 2, wherein enabling access to the virtual storage partition by the one or more other users involves at least one of:
    automatically transmitting the data to the one or more other users; and
    enabling queries from the one or more other users to the cloud computing system for the data.

4. The computer-implemented method of claim 2, wherein access to the virtual storage partition by the one or more other users is associated with at least one of:
    an invitation from the user to the one or more other users; and
    a request from the one or more other users to access the data.

5. The computer-implemented method of claim 1, wherein the data-sharing preferences are obtained with the data.

6. The computer-implemented method of claim 1, wherein the set of data-sharing preferences comprises at least one of:
    a data type;
    a data source;
    an electronic device associated with the user;
    a location of the user;
    a time span; and
    the one or more other users.

7. The computer-implemented method of claim 1, wherein the set of data attributes comprises at least one of:
    a data type;
    a data source;
    an identifier for the data;
    a timestamp;
    a location; and
    an electronic device associated with the data.

8. A system for processing data from a user, comprising:
    by one or more computers, performing operations of a storage-management apparatus configured to:
    obtain, at a cloud computing system, a set of data-sharing preferences for the user; and
    create a set of virtual storage partitions for the user with the cloud computing system based on the data-sharing preferences; and
    a synchronization apparatus configured to:
    associate data from the user to the cloud computing system with a virtual storage partition from the set of virtual storage partitions based on the data-sharing preferences and a set of data attributes for the data, the associating comprising matching a subset of the data-sharing preferences to one or more of the data attributes and identifying the virtual storage partition associated with the subset of the data-sharing preferences; and
    manage access to the virtual storage partition by one or more other users based on the data-sharing preferences.

9. The system of claim 8, wherein managing access to the virtual storage partition by the one or more other users based on the data-sharing preferences involves:
    enabling access to the virtual storage partition by the one or more other users if the one or more other users are associated with the subset of the data-sharing preferences; and
    denying access to the virtual storage partition by the one or more other users if the one or more other users are not associated with the subset of the data-sharing preferences.

10. The system of claim 9, wherein enabling access to the virtual storage partition by the one or more other users involves at least one of:
   automatically transmitting the data to the one or more other users; and
   enabling queries from the one or more other users to the cloud computing system for the data.

11. The system of claim 9, wherein access to the virtual storage partition by the one or more other users is associated with at least one of:
   an invitation from the user to the one or more other users; and
   a request from the one or more other users to access the data.

12. The system of claim 8, wherein the data-sharing preferences are obtained with the data.

13. The system of claim 8, wherein the set of data-sharing preferences comprises at least one of:
   a data type;
   a data source;
   an electronic device associated with the user;
   a location of the user;
   a time span; and
   the one or more other users.

14. The system of claim 8, wherein the set of data attributes comprises at least one of:
   a data type;
   a data source;
   an identifier for the data;
   a timestamp;
   a location; and
   an electronic device associated with the data.

15. A non-transitory computer-readable storage medium storing instructions that when executed by a computer cause the computer to perform a method for processing data from a user, the method comprising:
   obtaining, at a cloud computing system, a set of data-sharing preferences for the user;
   creating a set of virtual storage partitions for the user with the cloud computing system based on the data-sharing preferences;
   upon receiving data from the user to the cloud computing system, associating the data with a virtual storage partition from the set of virtual storage partitions based on the data-sharing preferences and a set of data attributes for the data, the associating comprising matching a subset of the data-sharing preferences to one or more of the data attributes and identifying the virtual storage partition associated with the subset of the data-sharing preferences; and
   managing access to the virtual storage partition by one or more other users based on the data-sharing preferences.

16. The computer-readable storage medium of claim 15, wherein managing access to the virtual storage partition by the one or more other users based on the data-sharing preferences involves:
   enabling access to the virtual storage partition by the one or more other users if the one or more other users are associated with the subset of the data-sharing preferences; and
   denying access to the virtual storage partition by the one or more other users if the one or more other users are not associated with the subset of the data-sharing preferences.

17. The computer-readable storage medium of claim 16, wherein enabling access to the virtual storage partition by the one or more other users involves at least one of:
   automatically transmitting the data to the one or more other users; and
   enabling queries from the one or more other users to the cloud computing system for the data.

18. The computer-readable storage medium of claim 16, wherein access to the virtual storage partition by the one or more other users is associated with at least one of:
   an invitation from the user to the one or more other users; and
   a request from the one or more other users to access the data.

19. The computer-readable storage medium of claim 15, wherein the data-sharing preferences are obtained with the data.

20. The computer-readable storage medium of claim 15, wherein the set of data-sharing preferences comprises at least one of:
   a data type;
   a data source;
   an electronic device associated with the user;
   a location of the user;
   a time span; and
   the one or more other users.

21. The computer-readable storage medium of claim 15, wherein the set of data attributes comprises at least one of:
   a data type;
   a data source;
   an identifier for the data;
   a timestamp;
   a location; and
   an electronic device associated with the data.

* * * * *